Sept. 27, 1960  C. VAN DER LELY ET AL  2,953,891
ROTARY RAKE WHEEL
Filed May 10, 1955
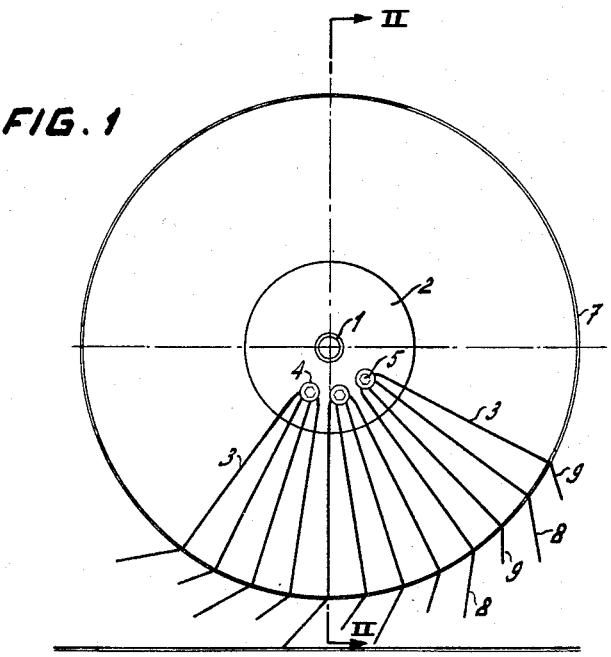
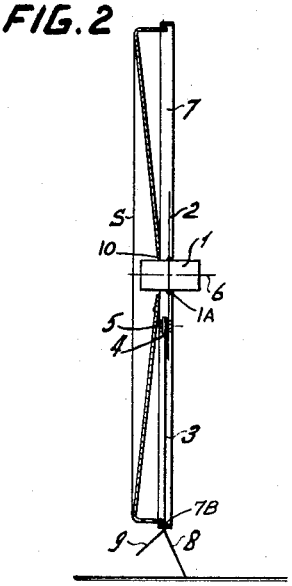
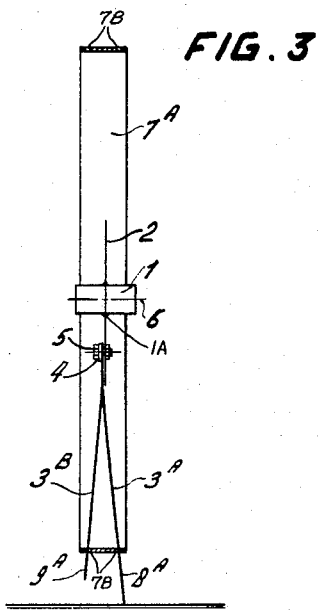

United States Patent Office 2,953,891
Patented Sept. 27, 1960

2,953,891
ROTARY RAKE WHEEL

Cornelis van der Lely and Ary van der Lely, Maasland, Netherlands, assignors to C. van der Lely N.V., Maasland, Netherlands, a Dutch limited company Filed May 10, 1955, Ser. No. 507,387

Claims priority, application Netherlands June 3, 1954

4 Claims. (Cl. 56—377)

This invention relates to rake wheels for side delivery rakes, swath turners and teddering devices and more particularly to rake wheels on which are provided a number of teeth having points at substantially the same distance to the axis of rotation of the associated rake wheel.

Rake wheels of this type are generally known and normally the distance between the points of adjacent teeth is not too great to insure that short pieces of material will not escape between the teeth and thus be left on the terrain. Thus, stones which are greater in size than the distance between adjacent points of the teeth will generally be carried along with the material with which they are mixed. These stones are very difficult to remove from the material and constitute a nuisance in the treatment of material. Unfortunately, however, the distance between the points of adjacent teeth cannot be enlarged too much as short pieces of material would be left on the field.

It is an object of the invention to provide a rake wheel which has lesser tendency to rake stones with crop and which has, nevereteheless an execllent raking ability. To achieve this object, the invention contemplates a rake wheel which has, in addition to the normal teeth, a number of teeth of a second kind, the points of which have a smaller distance to this axis of rotation of the rake wheel, the two different types of teeth being located between each other.

Further features and details will be hereinafter more fully described with reference to the accompanying drawings in which some preferred embodiments of the invention are illustrated by way of example and in which:

Fig. 1 is a front view of a rake wheel provided in accordance with one embodiment of the invention, a disc provided thereon being omitted for the sake of clarity;

Fig. 2 is a sectional view of the rake of Fig. 1 taken along line II—II, the disc being included; and Fig. 3 is a view, similar to Fig. 2, illustrating a further embodiment of the invention.

The rake wheel of Figs. 1 and 2 includes a hub 1 with a circular flat disc 2 secured thereon at a right angle by welds 1A. Spokes 3 are fastened to disc 2 and are manufactured in pairs from a single piece of steel wire which is bent to the shape of a hairpin. Two of said pairs, the bends of which have somewhat different radii of curvature, are clamped practically immovably against the disc 2 under a ring 4 by means of a bolt 5 extending through said disc. All spokes are bent at a predetermined distance from the common center line or axis of rotation 6 of the hub 1 and the disc 2 and extend in close proximity to this bend through holes 7B in a rim 7. The bends in the steel wires keep the rim 7 centered with the hub 1. The bent outer extremities of the spokes 3 constitute the peripheral teeth of the rake wheel.

The teeth can be considered as being of two distinct kinds or sets, viz. long teeth 8 and short teeth 9. The indication long and short is used for the sake of convenience since a more important difference is that the points of the teeth 8 are located farther from the center line 6 than the points of the teeth 9.

The teeth of the different sets are interposed. The teeth 8 are bent backwards, whereas the teeth 9 are bent forward, so that the latter teeth extend to that side of the rake wheel at which the accumulated material will lie. Preferably, the teeth 9 are each provided with a sharp point by which they easily penetrate into material lying on the ground. The teeth 8 moving along the ground, on the other hand, are blunt.

Besides the teeth 8 and 9 being bent backwards and forwards respectively, they are also bent in such a way that when viewed from the edge of the wheel, they form an angle with the spokes 3 which lie in the plane of rotation of the wheel. When viewed axially, all teeth are bent in the same predetermined direction to enable the material to fall easily from the teeth when the teeth move upwardly.

The short teeth 9 enable the escape of stones whereas long teeth 8 rake the material. Moreover, the backwardly inclined position of the long teeth 8 reduces their ability to carry the stones with them.

As is indicated in Fig. 2 at the front of the rake wheel, a closed disc S may be provided, the circumference of which lies substantially in a plane with the points of the teeth 9. The disc S is provided with a hole 10 to accommodate the hub 1 and is only fastened to the rim. The disc S works not only as a windscreen, but further prevents the points of the teeth 9 from coming too intensively into contact with large quantities of crop pushed by the wheel.

According to the embodiment shown in Fig. 3 of which the front elevation is also represented by Fig. 1, two kinds of teeth are provided, viz. long teeth 8A and short teeth 9A. The short teeth, however, are placed at a substantial distance in front of the long teeth.

Said teeth 8A and 9A, respectively, constitute the prolongation of spokes 3A and 3B which pass through a rim 7A which is broader than the rim 7 according to Fig. 2 and which is provided with two circular series of openings 7B. Openings 7B, in axial direction, are in spaced relation with regard to each other and, viewed from the front, those in one circle are arranged between those in the other circle. The spokes 3A and 3B are fastened in the same manner as the spokes 3 according to Fig. 2, but the spokes 3B and 3A, respectively, run to the foremost and hindmost circle of openings in the rim 7A.

Through the arrangements of the spokes and teeth mentioned above are very favorable, it will be clear that in principle also other arrangements of the teeth are possible. For example, the long and the short teeth may be located together in a single plane. Further, it will also be possible to alternate two or more short teeth and long teeth.

What we claim is:

1. A rake wheel having an axis of rotation and a preferred direction of rotation about said axis comprising a hub, a rim, first and second sets of teeth operatively associated with said hub and said rim and extending outwardly of said rim, the teeth of one set being interspersed with the teeth of the other set, the teeth of one set extending further from said axis than the teeth of the other set, all of said teeth being inclined in the same direction relative to radii and said direction of rotation of said wheel.

2. A rake wheel as claimed in claim 1 comprising spokes operatively associated with said hub, said spokes extending outwardly of said hub and being connected to said teeth.

3. A rake wheel as claimed in claim 1, wherein said rim is provided with holes through which said teeth extend.

4. A rake wheel as claimed in claim 1, wherein the teeth of said sets extend respectively to opposite sides of said wheel.

References Cited in the file of this patent

UNITED STATES PATENTS

| | | |
|---|---|---|
| 2,371,076 | Stevens | Mar. 6, 1945 |
| 2,670,588 | Plant | Mar. 2, 1954 |
| 2,689,446 | Sorrels | Sept. 21, 1954 |

FOREIGN PATENTS

| | | |
|---|---|---|
| 723,566 | Germany | June 25, 1942 |
| 480,889 | Italy | May 13, 1953 |

OTHER REFERENCES

Progress Report on the Finger Wheel Rake, Information Circular No. 4, Department of Agricultural Engineering, N.C. Agricultural Experiment Station, May 1951.